United States Patent
Kugimoto et al.

(10) Patent No.: US 12,428,555 B2
(45) Date of Patent: Sep. 30, 2025

(54) RESIN COMPOSITION AND MOLDED ARTICLE OBTAINED USING THIS RESIN COMPOSITION

(71) Applicant: TOSOH CORPORATION, Shunan (JP)

(72) Inventors: Daisuke Kugimoto, Yokkaichi (JP); Daisuke Kawato, Yokkaichi (JP); Shingo Kouda, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 1002 days.

(21) Appl. No.: 17/423,217

(22) PCT Filed: Jan. 20, 2020

(86) PCT No.: PCT/JP2020/001732
§ 371 (c)(1),
(2) Date: Jul. 15, 2021

(87) PCT Pub. No.: WO2020/153303
PCT Pub. Date: Jul. 30, 2020

(65) Prior Publication Data
US 2022/0106480 A1 Apr. 7, 2022

(30) Foreign Application Priority Data

Jan. 23, 2019 (JP) .................. 2019-009375
Nov. 18, 2019 (JP) .................. 2019-207702
Jan. 17, 2020 (JP) .................. 2020-005783

(51) Int. Cl.
| | | |
|---|---|---|
| *C08L 23/12* | (2006.01) | |
| *B29C 48/00* | (2019.01) | |
| *B29C 48/40* | (2019.01) | |
| *C08L 67/04* | (2006.01) | |
| *B29K 23/00* | (2006.01) | |
| *B29K 67/00* | (2006.01) | |
| *C08L 23/06* | (2006.01) | |
| *C08L 23/0853* | (2025.01) | |

(52) U.S. Cl.
CPC .......... *C08L 67/04* (2013.01); *B29C 48/0011* (2019.02); *B29C 48/022* (2019.02); *B29C 48/40* (2019.02); *B29K 2023/083* (2013.01); *B29K 2067/046* (2013.01); *C08L 23/06* (2013.01); *C08L 23/0853* (2013.01); *C08L 23/12* (2013.01); *C08L 2203/30* (2013.01); *C08L 2205/025* (2013.01); *C08L 2205/03* (2013.01); *C08L 2207/062* (2013.01); *C08L 2207/20* (2013.01)

(58) Field of Classification Search
CPC ...... C08L 67/04; C08L 23/06; C08L 23/0853; C08L 23/12; C08L 2203/30; C08L 2205/025; C08L 2205/03; C08L 2207/062; C08L 2207/20; C08L 67/02; C08L 31/04; C08L 101/00; B29C 48/0011; B29C 48/022; B29C 48/40; B29C 2948/9259; B29C 2948/92885; B29C 48/92; B29K 2023/083; B29K 2067/046; B29K 2105/0088
See application file for complete search history.

(56) References Cited

U.S. PATENT DOCUMENTS

| | | | |
|---|---|---|---|
| 4,714,728 A | | 12/1987 | Graham et al. |
| 4,786,685 A | * | 11/1988 | Takida .................. C08L 69/005 525/148 |
| 6,294,602 B1 | | 9/2001 | Shimo et al. |
| 9,890,279 B2 | * | 2/2018 | Minami .............. C08L 23/0853 |
| 2003/0027007 A1 | | 2/2003 | Wieczorek, Jr. et al. |
| 2006/0254575 A1 | | 11/2006 | Velazquez et al. |
| 2007/0117901 A1 | * | 5/2007 | Suzuki .................... C08L 77/02 524/442 |
| 2007/0255007 A1 | | 11/2007 | Dean |
| 2010/0069562 A1 | | 3/2010 | Dean |
| 2010/0144952 A1 | | 6/2010 | Dean |

(Continued)

FOREIGN PATENT DOCUMENTS

| | | |
|---|---|---|
| CN | 1243530 A | 2/2000 |
| CN | 102597094 A | 7/2012 |

(Continued)

OTHER PUBLICATIONS

Extended European Search Report dated Oct. 17, 2022 in European Application No. 20745899.3.

(Continued)

*Primary Examiner* — Kumar R Bhushan
(74) *Attorney, Agent, or Firm* — Sughrue Mion, PLLC

(57) ABSTRACT

This invention has an object to provide: a resin composition excellent in impact resistance, flexibility, and recyclability obtained as a result of blending a specific ethylene-vinyl acetate copolymer composition with a brittle resin, a recycled resin, or a composite resin including two or more kinds of different resins mixed therein; and a molded article produced with use of the resin composition. The resin composition includes: a thermoplastic resin (A) in an amount of not less than 1 weight % and not more than 99 weight %; and an ethylene-vinyl acetate copolymer composition (B) in an amount of not less than 1 weight % and not more than 99 weight %, the ethylene-vinyl acetate copolymer composition (B) including two or more kinds of ethylene-vinyl acetate copolymers having different vinyl acetate contents, the total amount of (A) and (B) being 100 weight %.

15 Claims, No Drawings

(56) References Cited

U.S. PATENT DOCUMENTS

| | | |
|---|---|---|
| 2010/0144953 A1 | 6/2010 | Dean |
| 2012/0219783 A1 | 8/2012 | Nomura et al. |
| 2014/0079935 A1 | 3/2014 | Broyles |
| 2018/0228209 A1 | 8/2018 | Tang et al. |
| 2019/0002677 A1 | 1/2019 | Haley et al. |
| 2019/0300763 A1 | 10/2019 | Kawato et al. |
| 2022/0106480 A1 | 4/2022 | Kugimoto et al. |

FOREIGN PATENT DOCUMENTS

| | | | | |
|---|---|---|---|---|
| CN | 104364309 A | * | 2/2015 | ............ H01B 3/441 |
| CN | 108949046 A | | 12/2018 | |
| EP | 0 347 794 A1 | | 12/1989 | |
| JP | 2000-302990 A | | 10/2000 | |
| JP | 2001-220473 A | | 8/2001 | |
| JP | 2002241548 A | * | 8/2002 | |
| JP | 2003301077 A | * | 10/2003 | |
| JP | 2004-182957 A | | 7/2004 | |
| JP | 2004-231772 A | | 8/2004 | |
| JP | 2005-23190 A | | 1/2005 | |
| JP | 2005023190 A | * | 1/2005 | |
| JP | 2006321988 A | * | 11/2006 | |
| JP | 2007-186622 A | | 7/2007 | |
| JP | 2007-217614 A | | 8/2007 | |
| JP | 2008-38142 A | | 2/2008 | |
| JP | 2008038142 A | * | 2/2008 | |
| JP | 2009-535452 A | | 10/2009 | |
| JP | 2012-24960 A | | 2/2012 | |
| JP | 2015-140361 A | | 8/2015 | |
| JP | 2018145407 A | * | 9/2018 | ............ B32B 27/00 |
| WO | 2007127276 A1 | | 11/2007 | |
| WO | WO-2014010500 A1 | * | 1/2014 | ............ H01B 3/441 |
| WO | 2018/015461 A1 | | 1/2018 | |
| WO | 2018/089575 A1 | | 5/2018 | |
| WO | 2018/113455 A1 | | 6/2018 | |
| WO | 2020153303 A1 | | 7/2020 | |

OTHER PUBLICATIONS

Chinese Office Action dated Oct. 26, 2022 in CN Application No. 202080008947.0.

Liu Yongbing, et al., "Interpenetrating Polymer Network Gel Profile Control and Flooding Technology", China University of Petroleum Press., Mar. 2008, p. 44 (5 pages).

Rui Huang, "Plastic Engineering Manual", Mechanical Industry Press, Apr. 2000, p. 46 (6 pages).

Ding Hao, "Plastic Industry Application Manual", Material Science and Engineering Publishing Center, Aug. 2000, p. 156 (4 pages).

Chinese Office Action dated Aug. 23, 2023 in Application No. 202110935189.3.

International Search Report dated Mar. 17, 2020 from the International Searching Authority in International Application No. PCT/JP2020/001732.

International Preliminary Report on Patentability with translation of Written Opinion dated Jul. 27, 2021 from the International Bureau in International Application No. PCT/JP2020/001732.

Chinese Office Action dated Feb. 23, 2024 in Chinese Application No. 202110935189.3.

Extended European Search Report issued Dec. 14, 2021 in European Application No. 21190768.8.

United States Office Action dated Dec. 27, 2022 in U.S. Appl. No. 17/401,515.

* cited by examiner

RESIN COMPOSITION AND MOLDED ARTICLE OBTAINED USING THIS RESIN COMPOSITION

CROSS REFERENCE TO RELATED APPLICATIONS

This application is a National Stage of International Application No. PCT/JP2020/001732, filed Jan. 20, 2020, claiming priority to Japanese Patent Application No. 2019-009375, filed Jan. 23, 2019, Japanese Patent Application No. 2019-207702, filed Nov. 18, 2019 and Japanese Patent Application No. 2020-005783, filed Jan. 17, 2020, the contents of all of which are incorporated herein by reference in their entirety.

TECHNICAL FIELD

The present invention relates to: a resin composition that includes a thermoplastic resin (A) and an ethylene-vinyl acetate copolymer composition (B) including two or more kinds of ethylene-vinyl acetate copolymers having different vinyl acetate contents and that is excellent in impact resistance and elongation at break; and a molded article made of the composition.

BACKGROUND ART

Polyesters and amorphous polymers, which have high rigidity and high durability, are used in a wide variety of applications from industrial members requiring high mechanical strength, such as housings for electronic devices and automobile materials, to consumables, such as food packages and daily necessaries. In recent years, social concern with the environmental issues has been growing, and there have been demands for development of materials with small environmental burdens, particularly biomass-derived resins, and for development of recycling technology for resins.

At the same time, for application to conventional usage, there has been a demand for further improvement in mechanical characteristics.

First, usages of some of the polyesters and amorphous polymers are limited due to their low impact resistance and low flexibility.

For example, in the context of the social tendency to reduce the environmental burdens, polylactic acid, which is representative biomass-derived polyester, has attracted attention for many years as an alternative material of a petroleum-derived plastic. However, due to its brittleness, usages of the polylactic acid are limited. Thus, the polylactic acid has not been in wide use up until now. Meanwhile, the field of the recycling technology for resins assumes contamination of various kinds of resins. With a large contamination resin amount, a problem caused by compatibility between resins is likely to occur. That is, a recycled resin including a large amount of incompatible resin exhibits poor mechanical characteristics. In order to deal with this, a resin should be recycled after being subjected to high-level sorting to reduce contamination. However, resins used for food packages and the like often have a multi-layered film structure in which various kinds of resins are laminated firmly. The multi-layered films cannot be easily separated from each other, and therefore the recycling technology cannot be applied this kind of resin. Thus, such resins are discarded.

Recently, as a technique for solving the problem, a polymer alloy technique is known. The polymer alloy technique combines various kinds of resins to make up for disadvantages of the resins. Furthermore, the polymer alloy technique brings about functions that have never existed before.

For example, there is a method for blending polylactic acid and soft polyester with each other to enhance impact resistance (Patent Literature 1). According to this method, soft polyester existing in the matrix of the polylactic acid as a domain functions as a modifier for giving impact resistance and/or flexibility. However, the impact resistance improving effect obtainable by this method is not sufficient.

For another example, there is a method for blending a compatibilizer with polylactic acid and polyolefin to enhance impact resistance and heat resistance (Patent Literature 2). However, this method requires a large amount of polyolefin to achieve sufficient impact resistance and sufficient heat resistance strength.

For further another example, there is a method for blending core-shell latex with polylactic acid to enhance impact resistance and to maintain transparency (Patent Literature 3). In this method, the shell-part provides compatibility with the polylactic acid, and the core-part provides the impact resistance. In addition, according to this method, the dispersed particle diameter would not be changed depending on the kneading method, and therefore stable performances can be attained. However, the core-shell latex is generally high at cost, and accordingly a material obtained as a result of blending of the core-shell latex is also high at cost.

As a method for recycling a laminated composite resin, addition of a compatibilizer is considered. For example, it is considered to use an ionomer resin as a compatibilizer to provide a PE-PET composite and a PP-ABS composite (Patent Literature 4). In addition, it is considered to use an oxazoline-based compatibilizer to provide a PE-PET composite, for example (Patent Literature 5). It is also considered to provide a PE-EVOH composite (Patent Literature 6). These literatures indicate that addition of the compatibilizer can enhance the physical properties of a composite of PE and PET, EVOH, or the like. However, recycled resins obtained by these methods do not have sufficient mechanical characteristics. Therefore, it is necessary to develop a technique that can provide a further improvement in the mechanical characteristics. In addition, the recycled resins have disadvantages of increased viscosity, yellowing, odors, and/or the like, and thus have poor repeated recyclability and are limited on the their usages.

These materials contribute to reduction in the environmental burdens. However, these materials are strongly demanded to further improve their brittleness.

CITATION LIST

Patent Literature

[Patent Literature 1]
Japanese Patent Application Publication Tokukai No. 2004-231772
[Patent Literature 2]
Japanese Patent Application Publication, Tokukai, No. 2008-038142
[Patent Literature 3]
Japanese Patent Application Publication, Tokukai, No. 2015-140361

[Patent Literature 4]
Japanese Patent Application Publication Tokukai No. 2001-220473
[Patent Literature 5]
Japanese Patent Application Publication Tokukai No. 2004-182957
[Patent Literature 6]
Published Japanese Translation of PCT International Application Tokuhyo No. 2009-535452

SUMMARY OF INVENTION

Technical Problem

An object of an aspect of the present invention is to provide: a resin composition that has overcome its brittleness and achieved excellent impact resistance and excellent flexibility as a result of blending a specific ethylene-vinyl acetate copolymer composition with a biomass-derived resin or a recycled composite resin; and a molded article produced with use of the resin composition.

Solution to Problem

The inventors of the present invention made diligent studies to attain the object. As a result, the inventors of the present invention found that a resin composition obtained by blending a specific ethylene-vinyl acetate copolymer composition with a brittle resin or brittle resin composition exhibits excellent impact resistance and excellent flexibility, and completed the present invention.

Specifically, the present invention has any of the following features [1] to [16].

[1] A resin composition including: a thermoplastic resin (A) in an amount of not less than 1 weight % and not more than weight %; and an ethylene-vinyl acetate copolymer composition (B) in an amount of not less than 1 weight % and not more than 99 weight %, the ethylene-vinyl acetate copolymer composition (B) including two or more kinds of ethylene-vinyl acetate copolymers having different vinyl acetate contents, a total amount of (A) and (B) being 100 weight %.

[2] The resin composition described in [1], wherein the ethylene-vinyl acetate copolymer composition (B) includes three or more kinds of ethylene-vinyl acetate copolymers having different vinyl acetate contents.

[3] The resin composition described in [1] or [2], wherein in a case where a difference in vinyl acetate content is taken between the copolymers in the ethylene-vinyl acetate copolymer composition (B), a difference in vinyl acetate content between copolymers of at least one pair among the copolymers in the ethylene-vinyl acetate copolymer composition (B) is not more than 40 weight %.

[4] The resin composition described in any one of [1] to [3], wherein in a case where a difference in vinyl acetate content is taken between the copolymers in the ethylene-vinyl acetate copolymer composition (B), a difference in vinyl acetate content between copolymers of every pair among the copolymers in the ethylene-vinyl acetate copolymer composition (B) is not more than 70 weight %.

[5] The resin composition described in any one of [1] to [4], wherein the ethylene-vinyl acetate copolymer composition (B) is crosslinked.

[6] The resin composition described in any one of [1] to [5], wherein the ethylene-vinyl acetate copolymer composition (B) is a hydrolysate.

[7] The resin composition described in any one of [1] to [6], wherein the thermoplastic resin (A) contains at least one kind selected from the group consisting of polyolefin, polyester, an acrylic resin, polyamide, polycarbonate, polystyrene, and a styrene-acrylonitrile copolymer.

[8] The resin composition described in any one of [1] to [7], wherein the thermoplastic resin (A) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, polybutylene terephthalate, polylactic acids including poly-L-lactic acid, poly-D-lactic acid, a copolymer of L-lactic acid and D-lactic acid, and a stereo complex of poly-L-lactic acid and poly-D-lactic acid, and polybutylene succinate.

[9] The resin composition described in [8], wherein the thermoplastic resin (A) is at least one kind selected from the group consisting of polylactic acids including poly-L-lactic acid, poly-D-lactic acid, a copolymer of L-lactic acid and D-lactic acid, and a stereo complex of poly-L-lactic acid and poly-D-lactic acid, and polybutylene succinate.

[10] The resin composition described in [8], wherein the thermoplastic resin (A) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, and polybutylene terephthalate.

[11] A method for producing the resin composition described in any one of [1] to [10], the method including the step of: kneading the thermoplastic resin (A) and the ethylene-vinyl acetate copolymer composition (B) with a twin-screw extruder.

[12] The method described in [11], wherein in the step of kneading the thermoplastic resin (A) and the ethylene-vinyl acetate copolymer composition (B) with the twin-screw extruder, the twin-screw extruder operates at a screw speed of not lower than 50 rpm and not higher than 3000 rpm.

[13] A resin composition obtained by the method described in [12].

[14] A molded product obtained by molding the resin composition described in any one of [1] to [10] and [13].

[15] A resin modifier including two or more kinds of ethylene-vinyl acetate copolymer compositions having different vinyl acetate contents.

[16] The resin modifier described in [15], wherein the resin modifier makes at least two kinds of resins compatible with each other to make the at least two kinds of resins recyclable.

DESCRIPTION OF EMBODIMENTS

The following will provide a detailed description of the present invention.

The thermoplastic resin (A) in accordance with an aspect of the present invention is preferably at least one kind selected from the group consisting of polyolefin-based resins, acrylic acid-based resins, polyamide-based resins, polyester-based resins, polycarbonate resins, polystyrene resins, and a styrene-acrylonitrile copolymer, since they have excellent compatibility with the ethylene-vinyl acetate copolymer composition (B).

Examples of the polyolefin-based resin encompass high-density polyethylene, low-density polyethylene, linear low-density polyethylene, polypropylene, an ethylene-propylene copolymer, an ethylene-vinyl alcohol copolymer, an ethylene-acrylic acid copolymer, an ethylene-methacrylic acid copolymer, an ethylene-acrylic acid ester copolymer, an ethylene-methacrylic acid ester copolymer, polybutadiene, and polyisoprene.

Examples of the acrylic acid-based resin encompass poly (acrylic acid), poly(methyl acrylate), poly(ethyl acrylate), poly(butyl acrylate), poly(octyl acrylate), poly(methacrylic acid), poly(methyl methacrylate), poly(ethyl methacrylate), poly(butyl methacrylate), and poly(octyl methacrylate).

Examples of the polyamide-based resin encompass nylon 6, nylon 6,6, nylon 11, and nylon 12.

Examples of the polyester resin encompass polyethylene terephthalate, a glycol-modified polyethylene terephthalate resin (PETG resin), polybutylene terephthalate, polylactic acids (including poly-L-lactic acid, poly-D-lactic acid, a copolymer of L-lactic acid and D-lactic acid, and a stereo complex of poly-L-lactic acid and poly-D-lactic acid), polybutylene succinate, poly(butylene succinate/adipate), polyethylene succinate, poly(butylene succinate/terephthalate), poly(butylene adipate/terephthalate), poly(hydroxy butyrate/hydroxy hexanoate), polyglycolic acid, poly(3-hydroxy butyrate), and polycaprolactone.

Among these, at least either of the polyester-based resin and the acrylic acid-based resin is preferable, since blending the polyester-based resin and/or the acrylic acid-based resin with the ethylene-vinyl acetate copolymer composition (B) results in great improvements in impact resistance and elongation at break. At least one kind selected from the group consisting of polylactic acid, polybutylene succinate, polyglycolic acid, poly(3-hydroxy butyrate), and polycaprolactone, each of which is a biodegradable polyester resin, is more preferable. Polylactic acid or polybutylene succinate is particularly preferable.

The thermoplastic resin (A) in accordance with an aspect of the present invention is preferably at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin (PETG resin), polybutylene terephthalate, polylactic acids (including poly-L-lactic acid, poly-D-lactic acid, a copolymer of L-lactic acid and D-lactic acid, and a stereo complex of poly-L-lactic acid and poly-D-lactic acid), and polybutylene succinate.

The thermoplastic resin (A) in accordance with an aspect of the present invention is preferably at least one kind selected from the group consisting of polylactic acids (including poly-L-lactic acid, poly-D-lactic acid, a copolymer of L-lactic acid and D-lactic acid, and a stereo complex of poly-L-lactic acid and poly-D-lactic acid), and polybutylene succinate.

In a case where the thermoplastic resin (A) is polylactic acid, such a thermoplastic resin (A) is a polymer containing L-lactic acid and/or D-lactic acid as a main component. However, the polylactic acid selected as the thermoplastic resin (A) is preferably a polylactic acid-based resin containing a lactic acid component having high optical purity, from the viewpoint of heat resistance. Specifically, the polylactic acid-based resin preferably contains, in its total lactic acid component, L-isomer by not less than 80% or D-isomer by not less than 80%, more preferably L-isomer by not less than 90% or D-isomer by not less than 90%, particularly preferably L-isomer by not less than 95% or D-isomer by not less than 95%, most preferably L-isomer by not less than 98% or D-isomer by not less than 98%.

The thermoplastic resin (A) in accordance with an aspect of the present invention is preferably at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin (PETG resin), and polybutylene terephthalate.

The thermoplastic resin (A) in accordance with an aspect of the present invention may be one kind or a composite of two or more kinds.

The thermoplastic resin (A) in accordance with an aspect of the present invention may be an unused virgin resin, a used recovered resin, or a recycled resin. The recycled resin herein means a resin having undergone the processes of washing, separation of a foreign matter, sorting, and the like, in contrast to the used recovered resin. Specifically, the recycled resin encompasses a form in which all of one or plural kinds of resin(s) is/are an unused resin(s), a form in which at least one kind of one or plural kinds of resin(s) is/are a used resin(s), and a form in which all of one or plural kind(s) of resin(s) is/are a used resin(s).

In a case where the thermoplastic resin (A) in accordance with an aspect of the present invention is a recovered resin or a recycled resin, such a thermoplastic resin (A) may contain plural kinds of resins. In this case, the thermoplastic resin (A) contains, as an impurit(ies), organic impurit(ies) such as a polyvinyl chloride resin, a wax, an adhesive, a plasticizer, and/or an antioxidant. The total amount of the organic impurit(ies) is not more than 3 weight %. Meanwhile, the thermoplastic resin (A) may contain an inorganic impurity as a filler. In a case where the thermoplastic resin (A) contains an impurit(ies), the content of the impurit(ies) can be expressed as a percentage relative to the total amount of the thermoplastic resin (A), the ethylene-vinyl acetate copolymer composition (B), and the impurit(ies).

As for the molecular weight and the molecular weight distribution of the thermoplastic resin (A), the thermoplastic resin (A) preferably has a weight average molecular weight of not less than 10,000, more preferably not less than 50,000, even more preferably not less than 100,000, since the thermoplastic resin (A) having a weight average molecular weight within the range can give rigidity that makes a resulting resin composition applicable to a molded product. The weight average molecular weight herein is a weight average molecular weight in terms of polystyrene measured by gel permeation chromatography (GPC) involving use of tetrahydrofuran as a solvent.

The thermoplastic resin (A) preferably has a melt mass-flow rate of not less than 0.1 g/10 minutes and not more than 50 g/10 minutes, more preferably not less than 0.1 g/10 minutes and not more than 20 g/10 minutes, since the thermoplastic resin (A) having a melt mass-flow rate within the range provides excellent formability. In a case where the thermoplastic resin (A) is polylactic acid or polybutylene succinate, such a thermoplastic resin (A) preferably has a melt mass-flow rate of not less than 0.1 g/10 minutes and not more than 20 g/10 minutes, more preferably not less than 1 g/10 minutes and not more than 10 g/10 minutes. Here, the melt mass-flow rate can be measured in accordance with the method defined in JIS K6924-1, and can be measured by a generally-used melt indexer at 190° C. under a load of 2.16 kg.

The ethylene-vinyl acetate copolymer composition (B) in accordance with an aspect of the present invention includes two or more kinds of ethylene-vinyl acetate copolymers having different vinyl acetate contents.

The vinyl acetate content (i.e., the content of vinyl acetate) of each of the ethylene-vinyl acetate copolymers in the ethylene-vinyl acetate copolymer composition (B) is preferably not less than 15 weight % and not more than 85 weight %. Here, the vinyl acetate content can be measured in accordance with the method defined in JIS K6924-1.

A method for producing the ethylene-vinyl acetate copolymer may be, e.g., a known production method, such as high-pressure radical polymerization, solution polymerization, or emulsion polymerization. Such a resin can be appropriately selected from commercially-available products, examples of which encompass Ultrasen (product name) available from Tosoh Corporation and Levapren (product name) and Levamelt (product name) each available from Lanxess K.K.

The composition in accordance with an aspect of the present invention is preferably configured such that, in a case where a difference in vinyl acetate content is taken between the copolymers in the ethylene-vinyl acetate copolymer composition (B), a difference in vinyl acetate content between copolymers of at least one pair among the copolymers in the ethylene-vinyl acetate copolymer composition (B) is not more than 40 weight %. This further enhances the compatibility between the ethylene-vinyl acetate copolymers constituting the composition (B), thereby improving the impact resistance and flexibility of a composition to be obtained. The difference in vinyl acetate content in at least one pair of copolymers is preferably not more than 35 weight %, even more preferably not more than 30 weight %, most preferably not more than 28 weight %.

Furthermore, the difference in vinyl acetate content between copolymers of at least one pair is preferably not less than 5 weight %. This further enhances the compatibility between the thermoplastic resin (A) and the ethylene-vinyl acetate copolymers constituting the composition (B), thereby improving the impact resistance and flexibility of a composition to be obtained.

Here, the difference in vinyl acetate content between the copolymers in the ethylene-vinyl acetate copolymer composition (B) can be calculated as below, where the copolymers are three kinds of ethylene-vinyl acetate copolymers having vinyl acetate contents of 25 weight %, 50 weight %, and 80 weight % (hereinafter, these vinyl acetate contents will be respectively expressed as VAc25, VAc50, and VAc80), for example.

$$VAc50 - VAc25 = 25 \text{ weight \%}$$

$$VAc80 - VAc50 = 30 \text{ weight \%}$$

$$VAc80 - VAc25 = 55 \text{ weight \%}$$

The composition in accordance with an aspect of the present invention is preferably configured such that, in a case where a difference in vinyl acetate content is taken between the copolymers in the ethylene-vinyl acetate copolymer composition (B), a difference in vinyl acetate content between copolymers of every pair among the copolymers in the ethylene-vinyl acetate copolymer composition (B) is not more than 70 weight %. This further improves the transparency of a composition to be obtained. Preferably, the difference in vinyl acetate content in every pair of copolymers is not more than 60 weight %.

In addition, the difference in vinyl acetate content in every pair of copolymers is preferably not less than 5 weight %. This enhances the compatibility between the thermoplastic resin (A) and the ethylene-vinyl acetate copolymers constituting the composition (B), thereby improving the impact resistance and flexibility of a composition to be obtained.

The ethylene-vinyl acetate copolymer composition (B) in accordance with an aspect of the present invention preferably includes three or more kinds of ethylene-vinyl acetate copolymers having different vinyl acetate contents. In this case, the ethylene-vinyl acetate copolymer composition (B) preferably includes the following ethylene-vinyl acetate copolymers.

An ethylene-vinyl acetate copolymer having a vinyl acetate content of not less than 15 weight % and not more than 30 weight %.

An ethylene-vinyl acetate copolymer having a vinyl acetate content of not less than 45 weight % and not more than 55 weight %.

An ethylene-vinyl acetate copolymer having a vinyl acetate content of not less than 75 weight % and not more than 85 weight %.

In order to satisfy this, it is possible to select, as the ethylene-vinyl acetate copolymers constituting the ethylene-vinyl acetate copolymer composition (B), two or more kinds of ethylene-vinyl acetate copolymers, preferably three or more kinds of ethylene-vinyl acetate copolymers. Such an ethylene-vinyl acetate copolymer composition can be expressed as, e.g., (VAc25+VAc40), (VAc25+VAc50), (VAc50+VAc80), (VAc25+VAc50+VAc80), (VAc25+VAc50+VAc70+VAc80), (VAc25+VAc40+VAc50+VAc70), or VAc25+VAc40+VAc50+VAc70+VAc80), where VAc25 denotes an ethylene-vinyl acetate copolymer having a vinyl acetate content of 25 weight % and composition of the components is expressed with (+).

The ethylene-vinyl acetate copolymers constituting the ethylene-vinyl acetate copolymer composition (B) in accordance with an aspect of the present invention may be crosslinked.

The crosslinking/modifying method may be a method involving addition of a crosslinking agent to the ethylene-vinyl acetate copolymer composition (B). The crosslinking agent is not limited to any particular one, provided that it can crosslink the components. In consideration of the reactivity and the like, the crosslinking agent is preferably an organic peroxide.

The organic peroxide used as the crosslinking agent is not limited to any particular one, provided that it is an organic peroxide. Examples of the organic peroxide encompass dicumyl peroxide, di-t-butyl peroxide, 2,5-dimethyl-2,5-di (t-butyl peroxy)hexane, 1,1-di(t-butyl peroxy)cyclohexane, 2,5-dimethyl-2,5-di(t-butyl peroxy)hexyne-3, 1,3-bis(t-butyl peroxy isopropyl)benzene, 1,1-bis(t-butyl peroxy)-3, 3,5-trimethylcyclohexane, 1,3-di-(t-butyl peroxy)-diisopropylbenzene, n-butyl-4,4-bis(t-butyl peroxy)valerate, benzoyl peroxide, p-chlorobenzoyl peroxide, 2,4-dichlorobenzoyl peroxide, t-butyl peroxybenzoate, t-butyl peroxyisopropylcarbonate, diacetyl peroxide, lauroyl peroxide, and t-butyl cumyl peroxide. One kind of them may be used alone, or two or more kinds may be used by mixing.

Among these, 2,5-dimethyl-2,5-di(t-butyl peroxy)hexane or 1,1-di(t-butyl peroxy)cyclohexane is preferably used, from the viewpoint of reactivity. Together with the crosslinking agent, a crosslinking aid such as triallyl isocyanurate or divinylbenzene may be used as needed.

By kneading the ethylene-vinyl acetate copolymer composition (B) containing the crosslinking agent while applying heat thereto, it is possible to crosslink the ethylene-vinyl acetate copolymer composition (B). The kneading temperature in this process is preferably in a range from a melting point of the ethylene-vinyl acetate copolymer composition (B) to approximately 300° C.

The ethylene-vinyl acetate copolymer composition (B) in accordance with an aspect of the present invention may be hydrolyzed to enhance the compatibility with the thermoplastic resin (A), so that the vinyl acetate is converted into vinyl alcohol.

The hydrolysis method is not limited to any particular one. Preferably, the hydrolysis method is a method of directly hydrolyzing pellets of the ethylene-vinyl acetate copolymer composition (B) in alkali. The degree of saponification of the ethylene-vinyl acetate copolymer composition (B) in accordance with an aspect of the present invention is preferably not less than 10 weight %. Setting the degree of saponification so as to be not less than 10 weight % enhances the compatibility with the thermoplastic resin (A).

Here, the degree of saponification can be measured in accordance with JIS K7192 (1999).

The mixture ratio between the thermoplastic resin (A) and the ethylene-vinyl acetate copolymer composition (B) in the resin composition in accordance with an aspect of the present invention is preferably set so that the resin composition contains the thermoplastic resin (A) in an amount of not less than 1 weight % and not more than 99 weight % and the ethylene-vinyl acetate copolymer composition (B) in an amount of not less than 1 weight % and not more than 99 weight %. A resin composition produced to contain the thermoplastic resin (A) in an amount of not more than 99 weight % exhibits excellent impact resistance. A resin composition produced to contain the thermoplastic resin (A) in an amount of not less than 1 weight % exhibits excellent rigidity. The resin composition in accordance with an aspect of the present invention even more preferably contains the thermoplastic resin (A) in an amount of not less than 30 weight % and not more than 95 weight % and the ethylene-vinyl acetate copolymer composition (B) in an amount of not less than 5 weight % and 70 weight %, even more preferably contains the thermoplastic resin (A) in an amount of not less than 50 weight % and not more than 90 weight % and the ethylene-vinyl acetate copolymer composition (B) in an amount of not less than 10 weight % and not more than 50 weight %.

The resin composition in accordance with an aspect of the present invention can be produced by a production method including the step of kneading the thermoplastic resin (A) and the ethylene-vinyl acetate copolymer composition (B).

Examples of the method of kneading the resin composition in accordance with an aspect of the present invention encompass: a method of simultaneously kneading the thermoplastic resin (A) and various materials constituting the ethylene-vinyl acetate copolymer composition (B) with a kneader; and a method of preliminarily kneading the ethylene-vinyl acetate copolymer composition (B) alone, followed by blending the thermoplastic resin (A) and the kneaded ethylene-vinyl acetate copolymer composition (B) together and further kneading the thermoplastic resin (A) and the ethylene-vinyl acetate copolymer composition (B). The latter method is preferable, since the latter method can more uniformly mix the ethylene-vinyl acetate copolymer composition (B) and can provide desired physical properties in a more stable manner.

The kneader is not limited to any particular one, provided that it can uniformly disperse the components. The production can be carried out with use of a generally-used kneader for resins. Examples of the kneader encompass a single-screw extruder, a twin-screw extruder, a multi-screw extruder, a Banbury mixer, a pressure kneader, a roll kneader, and an internal mixer. Of these, the twin-screw extruder is more preferable, since the twin-screw extruder is excellent in dispersing performance and continuous productivity.

In a case where the kneading is carried out with the twin-screw extruder, the screw speed of the twin-screw extruder is not limited to any particular one. Preferably, the kneading is carried out at a screw speed of not lower than 50 rpm and not higher than 3000 rpm, more preferably not lower than 300 rpm and not higher than 3000 rpm, even more preferably not lower than 500 rpm and not higher than 3000 rpm. Setting the screw speed so as to be not lower than 50 rpm is preferable, since this can improve the dispersibility of the mixed components and can provide a resin having favorable physical properties. Setting the screw speed so as to be not higher than 3000 rpm is preferable, since this can avoid deterioration of a resin due to excessive shear heat generation and can provide a resin having favorable physical properties.

In a case where the extruder is used in the kneading step, a resin composition obtained as a result of kneading with the extruder, preferably a resin composition obtained as a result of kneading under a high-speed shearing condition of not lower than 50 rpm and not higher than 3000 rpm can be used as a raw material. In addition, a molded product obtained by extrusion molding carried out with the extruder as it is can be used as a molded article.

The kneading temperature is preferably at a melting point of the thermoplastic resin (A). In a case of an amorphous resin, the kneading temperature is preferably in a range from a glass-transition temperature to approximately 300° C.

The resin composition in accordance with an aspect of the present invention may contain an antistatic agent, a light stabilizer, an ultraviolet absorber, a nucleating agent, a lubricant, an antioxidant, an antiblocking agent, a fluidity improving agent, a mold release agent, a flame retarder, a coloring agent, an inorganic neutralizer, a hydrochloric acid absorbent, a filler a conductive agent, a chain length extension agent, a hydrolysis inhibitor, and/or the like, within a range with which the effects of the present invention are not impaired.

In a case where the resin composition in accordance with an aspect of the present invention contains a component(s) other than (A) and (B), such as those described above, the content of such component(s) can be expressed as an added amount with respect to 100 parts by weight of the sum of (A) and (B). In other words, the expression "weight %" for (A) and (B) expresses a ratio between (A) and (B), and a percentage of the other component(s) can be defined separately.

The resin composition in accordance with an aspect of the present invention can be used in any form, e.g., in the form of pellets or powder.

The molding method of the resin composition in accordance with an aspect of the present invention may be selected arbitrarily. Examples of the molding method encompass contour extrusion, a film, a sheet, blowing, injection, foaming, extrusion coating, and rotational molding.

A molded article made of the resin composition in accordance with an aspect of the present invention is applicable to various usages, such as automobile parts, housings of electric and electronic parts, building materials, civil construction members, agricultural materials, containers, package materials, adhesives, and daily necessaries.

Another aspect of the present invention provides an impact strength modifier including two or more kinds of ethylene-vinyl acetate copolymer compositions having different vinyl acetate contents. This means that the modifier includes the above-described ethylene-vinyl acetate copolymer composition (B).

The modifier in accordance with another aspect of the present invention can make at least two kinds of resins compatible with each other to make them suitably applicable to recycling. Here, the resin to be recycled is the above-described thermoplastic resin (A). In practical application, the modifier can be used to composite two or more kinds selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin (PETG resin), and polybutylene terephthalate.

Advantageous Effects of Invention

A resin composition in accordance with an aspect of the present invention exhibits excellent impact resistance and excellent elongation at break, and is useful for a molded article that requires these physical properties.

EXAMPLES

The following will describe the present invention with reference to Examples and Comparative Examples. However, the present invention is not limited to them.
(1) Melt Mass-Flow Rate (MFR)
The MFRs of an ethylene-vinyl acetate copolymer and a thermoplastic resin (A) were measured with a melt indexer (available from Takara Kougyou) under conditions of a temperature of 190° C. and a load of 2.16 kg.
(2) Vinyl Acetate Content
The vinyl acetate content was measured in accordance with JIS K6924-1.
(3) Impact Strength
The impact strength was measured in accordance with JIS P 8134. A sheet having a thickness of 0.1 mm obtained by press-molding was subjected to measurement involving use of a film impact tester (available from Toyo Seiki, Co. Ltd., FT-M), carried out by striking with a hammer having a hemispheric head at a test capacity of 3J.
(4) Tensile Test
A tensile test was carried out as a test for flexibility. A sheet having a thickness of 0.1 mm obtained by press-molding was punched into a dumbbell-shaped test piece in accordance with ASTM D-1822-L. The test piece had a size with a total length of 63.5 mm, a parallel-part length of 9.53 mm, a parallel-part width of 3.18 mm, a thickness of 0.1 mm, and a grip-part width of 9.53 mm. The test piece was subjected to measurement involving use of a Tensilon tensile tester (available from Orientec Co. Ltd., RTE-1210) carried out under conditions of a distance between chucks of 30 mm and a tension rate of 200 mm/min. A point at which the sample was broken was regarded as elongation at break (elongation at break [%]=tensile length required for breakage [mm]/distance between chucks of 30 mm).

EXAMPLE 1

Used as the thermoplastic resin (A) was 90 weight % of polylactic acid (A-1) (available from NatureWorks Co. Ltd., product name: Ingeo4032D) having a L-isomer percentage of 98.5%, a D-isomer percentage of 1.5%, a weight average molecular weight of 180,000 g/mol, a melt mass-flow rate of 4 g/10 minutes, and a melting point of 170° C. Used as the ethylene-vinyl acetate copolymer composition (B) was 10 weight % of an ethylene-vinyl acetate copolymer having the following composition.
- 5 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 5 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

The thermoplastic resin (A) and the ethylene-vinyl acetate copolymer composition (B) were dry-blended, and a resultant was melted and kneaded with an internal mixer (available from Toyo Seiki, Co. Ltd., product name: Labo Plastomill R-100) under conditions of a resin temperature of 180° C., a roller speed of 60 rpm, and a kneading time of five minutes.

A resulting kneaded product was press-molded with a press-molding machine (available from Shinto Metal Industries, Ltd., AWFA-50) under conditions of a pressure of 10 MPa, a heating temperature of 200° C. (primary pressurizing for three minutes, secondary pressurizing for three minutes), and a cooling temperature of 25° C. (four minutes) to give a press sheet having a thickness of 0.1 mm.

The press sheet thus obtained was subjected to the tensile test and the impact test. The result of the evaluation is shown in Table 1.

EXAMPLE 2

A press sheet was obtained in the same procedures as in Example 1 except that 10 weight % of an ethylene-vinyl acetate copolymer composition (B) having the following composition was used.
- 4 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 3 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 3 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 1.

EXAMPLE 3

A press sheet was obtained in the same procedures as in Example 1 except that 80 weight % of polylactic acid (A-1) (available from NatureWorks Co. Ltd., product name: Ingeo4032D) having a L-isomer percentage of 98.5%, a D-isomer percentage of 1.5%, a weight average molecular weight of 180,000 g/mol, a melt mass-flow rate of 4 g/10 minutes, and a melting point of 170° C. was used as the thermoplastic resin (A) and 20 weight % of an ethylene-vinyl acetate copolymer having the following composition was used as the ethylene-vinyl acetate copolymer composition (B).
- 10 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 10 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

The press sheet thus obtained was subjected to the tensile test and the impact test. The result of the evaluation is shown in Table 1.

EXAMPLE 4

A press sheet was obtained by the same procedures as in Example 3 except that 20 weight % of an ethylene-vinyl acetate copolymer composition (B) having the following composition was used.
- 6 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 9 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 1.

EXAMPLE 5

A press sheet was obtained by the same procedures as in Example 3 except that 20 weight % of an ethylene-vinyl acetate copolymer composition (B) having the following composition was used.
- 6 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 3 weight % of an ethylene-vinyl acetate copolymer (B-40) (available from Lanxess K.K., product name: Levapren 400) having a vinyl acetate content of 40 weight % and a melt mass-flow rate of 3 g/10 minutes.
- 4 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 2 weight % of an ethylene-vinyl acetate copolymer (B-70) (available from Lanxess K.K., product name: Levapren 700) having a vinyl acetate content of 70 weight % and a melt mass-flow rate of 5 g/10 minutes.
- 5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 1.

EXAMPLE 6

A press sheet was obtained by the same procedures as in Example 1 except that 70 weight % of polylactic acid (A-1) (available from NatureWorks Co. Ltd., product name: Ingeo4032D) having a L-isomer percentage of 98.5%, a D-isomer percentage of 1.5%, a weight average molecular weight of 180,000 g/mol, a melt mass-flow rate of 4 g/10 minutes, and a melting point of 170° C. was used as the thermoplastic resin (A) and 30 weight % of an ethylene-vinyl acetate copolymer having the following composition was used as the ethylene-vinyl acetate copolymer composition (B).
- 9 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 4 weight % of an ethylene-vinyl acetate copolymer (B-40) (available from Lanxess K.K., product name: Levapren 400) having a vinyl acetate content of 40 weight % and a melt mass-flow rate of 3 g/10 minutes.
- 6 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 3 weight % of an ethylene-vinyl acetate copolymer (B-70) (available from Lanxess K.K., product name: Levapren 700) having a vinyl acetate content of 70 weight % and a melt mass-flow rate of 5 g/10 minutes.
- 8 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 1.

EXAMPLE 7

A press sheet was obtained by the same procedures as in Example 1 except that 50 weight % of polylactic acid (A-1) (available from NatureWorks Co. Ltd., product name: Ingeo4032D) having a L-isomer percentage of 98.5%, a D-isomer percentage of 1.5%, a weight average molecular weight of 180,000 g/mol, a melt mass-flow rate of 4 g/10 minutes, and a melting point of 170° C. was used as the thermoplastic resin (A) and 50 weight % of an ethylene-vinyl acetate copolymer having the following composition was used as the ethylene-vinyl acetate copolymer composition (B).
- 15 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 7 weight % of an ethylene-vinyl acetate copolymer (B-40) (available from Lanxess K.K., product name: Levapren 400) having a vinyl acetate content of 40 weight % and a melt mass-flow rate of 3 g/10 minutes.
- 10 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

5 weight % of an ethylene-vinyl acetate copolymer (B-70) (available from Lanxess K.K., product name: Levapren 700) having a vinyl acetate content of 70 weight % and a melt mass-flow rate of 5 g/10 minutes.

13 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 2.

EXAMPLE 8

A press sheet was obtained by the same procedures as in Example 3 except that 20 weight % of a crosslinked ethylene-vinyl acetate copolymer composition (B-crosslinked) was used as the ethylene-vinyl acetate copolymer composition (B). Note that the crosslinked ethylene-vinyl acetate copolymer composition (B-crosslinked) was obtained by the following method.

0.02 weight % of an organic peroxide (available from NOF Corporation, product name: PERHEXA 25B) was blended, as a crosslinking agent, with an ethylene-vinyl acetate copolymer composition having the composition shown below, and a resultant was melted and kneaded with an internal mixer (available from Toyo Seiki, Co. Ltd., product name: Labo Plastomill R-100) under conditions of a resin temperature of 180° C., a roller speed of 60 rpm, and a kneading time of two minutes to give an ethylene-vinyl acetate copolymer composition (B-crosslinked).

6 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.

3 weight % of an ethylene-vinyl acetate copolymer (B-40) (available from Lanxess K.K., product name: Levapren 400) having a vinyl acetate content of 40 weight % and a melt mass-flow rate of 3 g/10 minutes.

4 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

2 weight % of an ethylene-vinyl acetate copolymer (B-70) (available from Lanxess K.K., product name: Levapren 700) having a vinyl acetate content of 70 weight % and a melt mass-flow rate of 5 g/10 minutes.

5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 2.

EXAMPLE 9

A press sheet was obtained by the same procedures as in Example 1 except that 20 weight % of a saponified ethylene-vinyl acetate copolymer composition (B-saponified) was used as the ethylene-vinyl acetate copolymer composition (B). Note that the saponified ethylene-vinyl acetate copolymer composition (B-saponified) was obtained by the following method.

The crosslinked ethylene-vinyl acetate copolymer composition (B-crosslinked) described in Example 8 was hydrolyzed in 1 part by weight of a sodium hydroxide methanol solution at 60° C., so that the saponified ethylene-vinyl acetate copolymer composition (B-saponified) was obtained.

The press sheet thus obtained was subjected to the tensile test and the impact test. The result of the evaluation is shown in Table 2.

EXAMPLE 10

A press sheet was obtained by the same procedures as in Example 3 except that 20 weight % of an ethylene-vinyl acetate copolymer composition (B) having the following composition was used.

10 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.

10 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 2.

COMPARATIVE EXAMPLE 1

A press sheet was obtained by the same procedures as in Example 1 except that 100 weight % of polylactic acid (A-1) (available from NatureWorks Co. Ltd., product name: Ingeo4032D) having a L-isomer percentage of 98.5%, a D-isomer percentage of 1.5%, a melt mass-flow rate of 4 g/10 minutes, and a melting point of 170° C. was used as the thermoplastic resin (A).

The press sheet thus obtained was subjected to the tensile test and the impact test. The result of the evaluation is shown in Table 2.

COMPARATIVE EXAMPLE 2

A press sheet was obtained by the same procedures as in Example 3 except that 20 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes was used alone as the ethylene-vinyl acetate copolymer composition (B).

The press sheet thus obtained was subjected to the tensile test and the impact test. The result of the evaluation is shown in Table 2.

TABLE 1

| | | | Example | | | | | |
| --- | --- | --- | --- | --- | --- | --- | --- | --- |
| | | | 1 | 2 | 3 | 4 | 5 | 6 |
| Composition | Thermoplastic resin (A) | A-1 | 90 | 90 | 80 | 80 | 80 | 70 |
| | Ethylene-vinyl acetate copolymer (B) | B-25 | 5 | 4 | 10 | 6 | 6 | 9 |
| | | B-40 | | | | | 3 | 4 |
| | | B-50 | 5 | 3 | 10 | 9 | 4 | 6 |
| | | B-70 | | | | | 2 | 3 |
| | | B-80 | | 3 | | 5 | 5 | 8 |

TABLE 1-continued

| | | | Example | | | | | |
|---|---|---|---|---|---|---|---|---|
| | | | 1 | 2 | 3 | 4 | 5 | 6 |
| | Crosslinking agent | With/Without | | | | | | |
| (B) Details | Degree of saponification (%) | | 0 | 0 | 0 | 0 | 0 | 0 |
| | Difference in vinyl acetate content between components (weight %) | | 25 | 25 | 25<br>30<br>55 | 25<br>30<br>55 | 10<br>15<br>20<br>25<br>30<br>40<br>45<br>55 | 10<br>15<br>20<br>25<br>30<br>40<br>45<br>55 |
| Performance | Impact strength (kJ/m) | | 12.6 | 13.1 | 17.1 | 17.3 | 18.0 | 19.1 |
| | Elongation at break (%) | | 120 | 130 | 160 | 170 | 180 | 220 |

TABLE 2

| | | | Ex.*1 | | | | C. Ex.*2 | |
|---|---|---|---|---|---|---|---|---|
| | | | 7 | 8 | 9 | 10 | 1 | 2 |
| Composition | Thermoplastic resin (A) | A-1 | 50 | 80 | 80 | 80 | 100 | 80 |
| | Ethylene-vinyl acetate copolymer (B) | B-25 | 15 | 6 | 6 | 10 | | 20 |
| | | B-40 | 7 | 3 | 3 | | | |
| | | B-50 | 10 | 4 | 4 | | | |
| | | B-70 | 5 | 2 | 2 | | | |
| | | B-80 | 13 | 5 | 5 | 10 | | |
| | Crosslinking agent | With/Without | | With | With | | | |
| (B) Details | Degree of saponification (%) | | 0 | 0 | 50 | 0 | — | 0 |
| | Difference in vinyl acetate content between components (weight %) | | 10<br>15<br>20<br>25<br>30<br>40<br>45<br>55 | 10<br>15<br>20<br>25<br>30<br>40<br>45<br>55 | 10<br>15<br>20<br>25<br>30<br>40<br>45<br>55 | 55 | — | — |
| Performance | Impact strength (kJ/m) | | 23.7 | 19.0 | 18.9 | 9.8 | 1.7 | 2.9 |
| | Elongation at break (%) | | 400 | 160 | 150 | 85 | 4 | 44 |

*1"Ex." stands for "Example".
*2"C. Ex." stands for "Comparative Example".

EXAMPLE 11

A press sheet was obtained by the same procedures as in Example 1 except that 80 weight % of polybutylene succinate (A-2) (available from Mitsubishi Chemical Corporation, product name: GSP1a FZ91) having a melt mass-flow rate of 5 g/10 minutes and a melting point of 115° C. was used as the thermoplastic resin (A) and 20 weight % of an ethylene-vinyl acetate copolymer composition (B) having the following composition was used.

5 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.

5 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

10 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 3.

EXAMPLE 12

A press sheet was obtained by the same procedures as in Example 11 except that 20 weight % of an ethylene-vinyl acetate copolymer composition (B) having the following composition was used.

2 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.

2 weight % of an ethylene-vinyl acetate copolymer (B-40) (available from Lanxess K.K., product name: Levapren 400) having a vinyl acetate content of 40 weight % and a melt mass-flow rate of 3 g/10 minutes.

3 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

3 weight % of an ethylene-vinyl acetate copolymer (B-70) (available from Lanxess K.K., product name: Levapren 700) having a vinyl acetate content of 70 weight % and a melt mass-flow rate of 5 g/10 minutes.

10 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 3.

EXAMPLE 13

A press sheet was obtained by the same procedures as in Example 11 except that the crosslinked ethylene-vinyl acetate copolymer composition (B-crosslinked) described in Example 8 was used as 20 weight % of the ethylene-vinyl acetate copolymer composition (B).

The press sheet thus obtained was subjected to the tensile test and the impact test. The result of the evaluation is shown in Table 3.

COMPARATIVE EXAMPLE 4

A press sheet was obtained by the same procedures as in Example 11 except that 20 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes was used alone as the ethylene-vinyl acetate copolymer composition (B). The press sheet thus obtained was subjected to the tensile test and the impact test. The result of the evaluation is shown in Table 3.

TABLE 3

|  |  |  | Ex.*1 | | | | C. Ex.*2 | |
| --- | --- | --- | --- | --- | --- | --- | --- | --- |
|  |  |  | 11 | 12 | 13 | 14 | 3 | 4 |
| Composition | Thermoplastic resin (A) | A-2 | 80 | 80 | 80 | 80 | 100 | 80 |
|  | Ethylene-vinyl acetate copolymer (B) | B-25 | 5 | 2 | 6 | 6 |  | 20 |
|  |  | B-40 |  | 2 | 3 | 3 |  |  |
|  |  | B-50 | 5 | 3 | 4 | 4 |  |  |
|  |  | B-70 |  | 3 | 2 | 2 |  |  |
|  |  | B-80 | 10 | 10 | 5 | 5 |  |  |
|  | Crosslinking agent | With/Without |  |  | With | With |  |  |
| (B) Details | Degree of saponification (%) |  | 0 | 0 | 0 | 50 | — | 0 |
|  | Difference in vinyl acetate content between components (weight %) |  | 25 30 55 | 10 15 20 25 30 40 45 55 | 10 15 20 25 30 40 45 55 | 10 15 20 25 30 40 45 55 | — | — |
| Performance | Impact strength (kJ/m) |  | 12.1 | 15.1 | 15.4 | 15.2 | 2.5 | 0.8 |
|  | Elongation at break (%) |  | 80 | 95 | 90 | 85 | 5 | 3 |

*1"Ex." stands for "Example".
*2"C. Ex." stands for "Comparative Example".

The press sheet thus obtained was subjected to the tensile test and the impact test. The result of the evaluation is shown in Table 3.

EXAMPLE 14

A press sheet was obtained by the same procedures as in Example 11 except that the saponified ethylene-vinyl acetate copolymer composition (B-saponified) described in Example 9 was used as 20 weight % of the ethylene-vinyl acetate copolymer composition (B).

The press sheet thus obtained was subjected to the tensile test and the impact test. The result of the evaluation is shown in Table 3.

COMPARATIVE EXAMPLE 3

A press sheet was obtained by the same procedures as in Example 11 except that 100 weight % of polybutylene succinate (A-2) (available from Mitsubishi Chemical Corporation, product name: GSP1a FZ91) having a melt mass-flow rate of 5 g/10 minutes and a melting point of 115° C. was used as the thermoplastic resin (A).

EXAMPLE 15

A press sheet was obtained by the same procedures as in Example 1 except that 80 weight % of poly(methyl methacrylate) (A-3) (available from Kuraray Co., Ltd., product name: PARAPET G-1000) having a melt mass-flow rate of 0.2 g/10 minutes and a glass-transition temperature of 115° C. was used as the thermoplastic resin (A) and 20 weight % of an ethylene-vinyl acetate copolymer composition (B) having the following composition was used.

6 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.

3 weight % of an ethylene-vinyl acetate copolymer (B-40) (available from Lanxess K.K., product name: Levapren 400) having a vinyl acetate content of 40 weight % and a melt mass-flow rate of 3 g/10 minutes.

4 weight % of an ethylene-vinyl acetate copolymer (B-50) (available from Lanxess K.K., product name: Levapren 500) having a vinyl acetate content of 50 weight % and a melt mass-flow rate of 3 g/10 minutes.

2 weight % of an ethylene-vinyl acetate copolymer (B-70) (available from Lanxess K.K., product name: Levapren 700) having a vinyl acetate content of 70 weight % and a melt mass-flow rate of 5 g/10 minutes.

5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 4.

EXAMPLE 16

A press sheet was obtained by the same procedures as in Example 15 except that the crosslinked ethylene-vinyl acetate copolymer composition (B-crosslinked) described in Example 8 was used as 20 weight % of the ethylene-vinyl acetate copolymer composition (B).

The press sheet thus obtained was subjected to the tensile test and the impact test. The result of the evaluation is shown in Table 4.

COMPARATIVE EXAMPLE 5

A press sheet was obtained by the same procedures as in Example 15 except that 100 weight % of poly(methyl methacrylate) (A-3) (available from Kuraray Co., Ltd., product name: PARAPET G-1000) having a melt mass-flow rate of 0.2 g/10 minutes and a glass-transition temperature of 115° C. was used as the thermoplastic resin (A).

The press sheet thus obtained was subjected to the tensile test and the impact test. The result of the evaluation is shown in Table 4. The result shows poor impact strength and poor elongation at break.

COMPARATIVE EXAMPLE 6

A press sheet was obtained by the same procedures as in Example 15 except that 20 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes was used alone as the ethylene-vinyl acetate copolymer composition (B). The press sheet thus obtained was subjected to the tensile test and the impact test. The result of the evaluation is shown in Table 4. The result shows poor impact strength and poor elongation at break.

TABLE 4

|  |  |  | Ex.*1 | | C. Ex.*2 | |
|---|---|---|---|---|---|---|
|  |  |  | 15 | 16 | 5 | 6 |
| Composition | Thermoplastic resin (A) | A-3 | 80 | 80 | 100 | 80 |
|  | Ethylene-vinyl acetate copolymer (B) | B-25 | 6 | 6 |  | 20 |
|  |  | B-40 | 3 | 3 |  |  |
|  |  | B-50 | 4 | 4 |  |  |
|  |  | B-70 | 2 | 2 |  |  |
|  |  | B-80 | 5 | 5 |  |  |
|  | Crosslinking agent | With/Without |  | With |  |  |
| (B) Details | Degree of saponification (%) |  | 0 | 0 | — | 0 |
|  | Difference in vinyl acetate content between components (weight %) |  | 10 | 10 | — | — |
|  |  |  | 15 | 15 |  |  |
|  |  |  | 20 | 20 |  |  |
|  |  |  | 25 | 25 |  |  |
|  |  |  | 30 | 30 |  |  |
|  |  |  | 40 | 40 |  |  |
|  |  |  | 45 | 45 |  |  |
|  |  |  | 55 | 55 |  |  |
| Performance | Impact strength (kJ/m) |  | 2.1 | 2.2 | 0.8 | 0.7 |
|  | Elongation at break (%) |  | 5 | 5 | 3 | 3 |

*1"Ex." stands for "Example".
*2"C. Ex." stands for "Comparative Example".

EXAMPLE 17

70 weight % of a thermoplastic resin composition having the composition show below was used as the thermoplastic resin (A). 30 weight % of an ethylene-vinyl acetate copolymer having the composition shown below was used as the ethylene-vinyl acetate copolymer composition (B).

[Thermoplastic Resin Composition (A)]
- 17.5 weight % of high-density polyethylene (A-4) (available from Tosoh Corporation, product name: Niporon HD4020) having a melt mass-flow rate of 5.5 g/10 minutes and a melting point of 133° C.
- 17.5 weight % of polypropylene (A-5) (available from Japan Polypropylene Corporation, product name: NOVATEC PP FW4BT) having a melt mass-flow rate of 6.5 g/10 minutes and a melting point of 137° C.
- 17.5 weight % of PETG resin (A-6) (available from Eastman Chemical Company, product name: Eastar GN5011) having a glass-transition temperature of 67° C.
- 17.5 weight % of an ethylene-vinyl alcohol copolymer (A-7) (available from Kuraray Co., Ltd., product name: EVAL C109B) having an ethylene content of 35 mol % and a melting point of 177° C.

[Ethylene-Vinyl Acetate Copolymer Composition (B)]
- 15 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 7.5 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 7.5 weight % of an ethylene-vinyl acetate copolymer (B-80) (available from Lanxess K.K., product name:

Levapren 800) having a vinyl acetate content of 80 weight % and a melt mass-flow rate of 5 g/10 minutes.

The thermoplastic resins (A-4) to (A-7) and the ethylene-vinyl acetate copolymer composition (B) were dry-blended, and a resultant was melted and kneaded with an internal mixer (available from Toyo Seiki, Co. Ltd., product name: Labo Plastomill R-100) under conditions of a resin temperature of 200° C., a roller speed of 60 rpm, and a kneading time of five minutes.

A resulting kneaded product was press-molded with a press-molding machine (available from Shinto Metal Industries, Ltd., AWFA-50) under conditions of a pressure of 10 MPa, a heating temperature of 200° C. (primary pressurizing for three minutes, secondary pressurizing for three minutes), and a cooling temperature of 25° C. (four minutes) to give a press sheet having a thickness of 0.1 mm.

The press sheet thus obtained was subjected to the tensile test and the impact test. The result of the evaluation is shown in Table 5.

EXAMPLE 18

A press sheet was obtained by the same procedures as in Example 17 except that 30 weight % of an ethylene-vinyl acetate copolymer composition (B) having the following composition was used.

- 9 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 4 weight % of an ethylene-vinyl acetate copolymer (B-40) (available from Lanxess K.K., product name: Levapren 400) having a vinyl acetate content of 40 weight % and a melt mass-flow rate of 3 g/10 minutes.
- 6 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 3 weight % of an ethylene-vinyl acetate copolymer (B-70) (available from Lanxess K.K., product name: Levapren 700) having a vinyl acetate content of 70 weight % and a melt mass-flow rate of 5 g/10 minutes.
- 8 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 5.

COMPARATIVE EXAMPLE 7

A press sheet was obtained by the same procedures as in Example 17 except that 100 weight % of a thermoplastic resin composition having the following composition was used as the thermoplastic resin (A).

- 17.5 weight % of high-density polyethylene (A-4) (available from Tosoh Corporation, product name: Niporon HD4020) having a melt mass-flow rate of 5.5 g/10 minutes and a melting point of 133° C.
- 17.5 weight % of polypropylene (A-5) (available from Japan Polypropylene Corporation, product name: NOVATEC PP FW4BT) having a melt mass-flow rate of 6.5 g/10 minutes and a melting point of 137° C.
- 17.5 weight % of PETG resin (A-6) (available from Eastman Chemical Company, product name: Eastar GN5011) having a glass-transition temperature of 67° C.
- 17.5 weight % of an ethylene-vinyl alcohol copolymer (A-7) (available from Kuraray Co., Ltd., product name: EVAL C109B) having an ethylene content of 35 mol % and a melting point of 177° C.

The press sheet thus obtained was subjected to the tensile test and the impact test. The result of the evaluation is shown in Table 5.

COMPARATIVE EXAMPLE 8

A press sheet was obtained by the same procedures as in Example 17 except that, in place of the ethylene-vinyl acetate copolymer composition (B), 30 weight % of low-density polyethylene (available from Tosoh Corporation, product name: PETROSEN 217) having a density of 923 kg/m3, a melt mass-flow rate of 4 g/10 minutes, and a melting point of 109° C. was used as a thermoplastic resin (A-8).

The press sheet thus obtained was subjected to the tensile test and the impact test. The result of the evaluation is shown in Table 5.

COMPARATIVE EXAMPLE 9

A press sheet was obtained by the same procedures as in Example 17 except that 30 weight % of an ethylene-vinyl acetate copolymer (B-80) (available from Lanxess K.K., product name: Levapren 800) having a vinyl acetate content of 80 weight % and a melt mass-flow rate of 5 g/10 minutes was used as 30 weight % of the ethylene-vinyl acetate copolymer composition (B).

The press sheet thus obtained was subjected to the tensile test and the impact test. The result of the evaluation is shown in Table 5.

TABLE 5

| | | | Ex.*1 | | C. Ex.*2 | | |
|---|---|---|---|---|---|---|---|
| | | | 17 | 18 | 7 | 8 | 9 |
| Composition | Thermoplastic resin (A) | A-4 | 17.5 | 17.5 | 25 | 17.5 | 17.5 |
| | | A-5 | 17.5 | 17.5 | 25 | 17.5 | 17.5 |
| | | A-6 | 17.5 | 17.5 | 25 | 17.5 | 17.5 |
| | | A-7 | 17.5 | 17.5 | 25 | 17.5 | 17.5 |
| | | A-8 | | | | 30 | |
| | Ethylene-vinyl acetate copolymer (B) | B-25 | 15 | 9 | | | |
| | | B-40 | | 4 | | | |
| | | B-50 | 7.5 | 6 | | | |
| | | B-70 | | 3 | | | |
| | | B-80 | 7.5 | 8 | | | 30 |

TABLE 5-continued

|  |  |  | Ex.[1] | | C. Ex.[2] | | |
|---|---|---|---|---|---|---|---|
|  |  |  | 17 | 18 | 7 | 8 | 9 |
| (B) Details | Crosslinking agent | With/Without |  |  |  |  |  |
|  | Degree of saponification (%) |  | 0 | 0 | — | 0 | 0 |
|  | Difference in vinyl acetate content between components (weight %) |  | 25<br>30<br>55 | 10<br>15<br>20<br>25<br>30<br>40<br>45<br>55 | — | — | — |
| Performance | Impact strength (kJ/m) |  | 2.5 | 3.0 | 0.5 | 0.4 | 0.8 |
|  | Elongation at break (%) |  | 20 | 35 | 3 | 3 | 5 |

[1]"Ex." stands for "Example".
[2]"C. Ex." stands for "Comparative Example".

EXAMPLE 19

As the thermoplastic resin (A), 70 weight % of a used multi-layered film (A-Rc) including a polyethylene film having a thickness of 25 μm and a polyethylene terephthalate film having a thickness of 12 μm laminated via an adhesive was used. As the ethylene-vinyl acetate copolymer composition (B), 30 weight % of an ethylene-vinyl acetate copolymer having the composition shown below was used.

[Thermoplastic Resin (A-Rc)]
- PE: 40.7 weight % of low-density polyethylene (available from Tosoh Corporation, product name: PETROSEN 203) having a melt mass-flow rate of 8 g/10 minutes and a melting point of 105° C.
- Adhesive: 0.2 weight % of a mixture obtained by mixing an isocyanate-based anchor coat agent (available from Mitsui Chemicals, Inc., product name: TAKELAC A-3210) and an isocyanate-based anchor coat agent (available from Mitsui Chemicals, Inc., product name: TAKENATE A-3072) at a ratio of 3:1.
- PET: 29.1 weight % (available from TOYOBO Co., Ltd., product name: ESTER film E5100).

[Ethylene-Vinyl Acetate Copolymer Composition (B)]
- 15 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 7.5 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 7.5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The multi-layered film (A-Rc) was cut into a piece of approximately 5 mm square, which was a size that could be charged into an extruder. The piece was melted and kneaded with Labo Plastomill (available from Toyo Seiki, Co. Ltd.) to which a twin-screw extruder 2D25-S (available from Toyo Seiki, Co. Ltd.) was attached, under conditions of a resin temperature of 270° C. and a screw speed of 60 rpm. As a result, a multi-layered film (A-Rc) resin composition in the form of pellets was obtained.

70 weight % of the multi-layered film (A-Rc) resin composition and 30 weight % of the ethylene-vinyl acetate copolymer composition (B) preliminary kneaded were dry-blended, and a resultant was melted and kneaded with Labo Plastomill (available from Toyo Seiki, Co. Ltd.) to which a twin-screw extruder 2D25-S (available from Toyo Seiki, Co. Ltd.) was attached, under conditions of a resin temperature of 230° C. and a screw speed of 60 rpm. As a result, a resin composition in the form of pellets was obtained.

The resin composition pellets thus obtained were press-molded with a press-molding machine (available from Shinto Metal Industries, Ltd., AWFA-50) under conditions of a pressure of 10 MPa, a heating temperature of 200° C. (primary pressurizing for three minutes, secondary pressurizing for three minutes), and a cooling temperature of 25° C. (four minutes) to give a press sheet having a thickness of 0.1 mm.

The press sheet thus obtained was subjected to the tensile test and the impact test. The result of the evaluation is shown in Table 6.

EXAMPLE 20

A press sheet was obtained by the same procedures as in Example 19 except that 30 weight % of an ethylene-vinyl acetate copolymer composition (B) having the following composition was used.

- 9 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
- 4 weight % of an ethylene-vinyl acetate copolymer (B-40) (available from Lanxess K.K., product name: Levapren 400) having a vinyl acetate content of 40 weight % and a melt mass-flow rate of 3 g/10 minutes.
- 6 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
- 3 weight % of an ethylene-vinyl acetate copolymer (B-70) (available from Lanxess K.K., product name: Levapren 700) having a vinyl acetate content of 70 weight % and a melt mass-flow rate of 5 g/10 minutes.
- 8 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The press sheet thus obtained was subjected to the tensile test and the impact test. The result of the evaluation is shown in Table 6.

COMPARATIVE EXAMPLE 10

As the thermoplastic resin (A), 100 weight % of a multi-layered film (A-Rc) was used alone.

The multi-layered film (A-Rc) was cut into a piece having a size that could be charged into an extruder. The piece was melted and kneaded with Labo Plastomill (available from Toyo Seiki, Co. Ltd.) to which a twin-screw extruder 2D25-S (available from Toyo Seiki, Co. Ltd.) was attached, under conditions of a resin temperature of 270° C. and a screw speed of rpm. As a result, a multi-layered film (A-Rc) resin composition in the form of pellets was obtained.

The resin composition pellets thus obtained were press-molded with a press-molding machine (available from Shinto Metal Industries, Ltd., AWFA-50) under conditions of a pressure of 10 MPa, a heating temperature of 200° C. (primary pressurizing for three minutes, secondary pressurizing for three minutes), and a cooling temperature of 25° C. (four minutes) to give a press sheet having a thickness of 0.1 mm.

The press sheet thus obtained was subjected to the tensile test and the impact test. The result of the evaluation is shown in Table 6.

TABLE 6

| | | | Ex.*1 | | C. Ex.*2 |
|---|---|---|---|---|---|
| | | | 19 | 20 | 10 |
| Composition | Thermoplastic resin (A) | A-Rc | 70 | 70 | 100 |
| | Ethylene-vinyl acetate copolymer (B) | B-25 | 15 | 9 | |
| | | B-40 | | 4 | |
| | | B-50 | 7.5 | 6 | |
| | | B-70 | | 3 | |
| | | B-80 | 7.5 | 8 | |
| | Crosslinking agent | With/Without | | | |
| (B) Details | Degree of saponification (%) | | 0 | 0 | — |
| | Difference in vinyl acetate content between components (weight %) | | 25 | 10 | — |
| | | | 30 | 15 | |
| | | | 55 | 20 | |
| | | | | 25 | |
| | | | | 30 | |
| | | | | 40 | |
| | | | | 45 | |
| | | | | 55 | |
| Performance | Impact strength (kJ/m) | | 6.0 | 6.5 | 1.0 |
| | Elongation at break (%) | | 55 | 60 | 5 |

*1"Ex." stands for "Example".
*2"C. Ex." stands for "Comparative Example".

EXAMPLE 21

70 weight % of a thermoplastic resin composition having the composition shown below was used as the thermoplastic resin (A). 30 weight % of an ethylene-vinyl acetate copolymer having the composition shown below was used as the ethylene-vinyl acetate copolymer composition (B).
[Thermoplastic Resin Composition (A)]
  49 weight % of high-density polyethylene (A-4) (available from Tosoh Corporation, product name: Niporon HD4020) having a melt mass-flow rate of 5.5 g/10 minutes and a melting point of 133° C.
  7 weight % of polypropylene (A-5) (available from Japan Polypropylene Corporation, product name: NOVATEC PP FW4BT) having a melt mass-flow rate of 6.5 g/10 minutes and a melting point of 137° C.
  7 weight % of PETG resin (A-6) (available from Eastman Chemical Company, product name: Eastar GN5011) having a glass-transition temperature of 67° C.
  7 weight % of an ethylene-vinyl alcohol copolymer (A-7) (available from Kuraray Co., Ltd., product name: EVAL C109B) having an ethylene content of 35 mol % and a melting point of 177° C.
[Ethylene-Vinyl Acetate Copolymer Composition (B)]
  15 weight % of an ethylene-vinyl acetate copolymer (B-25) (available from Tosoh Corporation, product name: Ultrasen 640) having a vinyl acetate content of 25 weight % and a melt mass-flow rate of 3 g/10 minutes.
  7.5 weight % of an ethylene-vinyl acetate copolymer (B-50) (available from Lanxess K.K., product name: Levapren 500) having a vinyl acetate content of 50 weight % and a melt mass-flow rate of 3 g/10 minutes.
  7.5 weight % of an ethylene-vinyl acetate copolymer (B-80) (available from Lanxess K.K., product name: Levapren 800) having a vinyl acetate content of 80 weight % and a melt mass-flow rate of 5 g/10 minutes.

The thermoplastic resins (A-4) to (A-7) and the ethylene-vinyl acetate copolymer composition (B) were dry-blended, and a resultant was melted and kneaded with a twin-screw extruder (available from Technovel Corporation, product name: ULTnano25TW) having a screw diameter of 25 mm under conditions of a resin temperature of 200° C. and a screw speed of 100 rpm. As a result, a resin composition was obtained.

The resin composition thus obtained was press-molded with a press-molding machine (available from Shinto Metal Industries, Ltd., AWFA-50) under conditions of a pressure of 10 MPa, a heating temperature of 200° C. (primary pressurizing for three minutes, secondary pressurizing for three minutes), and a cooling temperature of 25° C. (four minutes) to give a press sheet having a thickness of 0.1 mm.

The press sheet thus obtained was subjected to the tensile test and the impact test. The result of the evaluation is shown in Table 7.

EXAMPLE 22

A press sheet was obtained by the same procedures as in Example 21 except that the screw speed of the twin-screw extruder was changed to 600 rpm.

The press sheet thus obtained was subjected to the tensile test and the impact test. The result of the evaluation is shown in Table 7.

COMPARATIVE EXAMPLE 11

A press sheet was obtained by the same procedures as in Example 22 except that 100 weight % of a thermoplastic resin composition having the following composition was used as the thermoplastic resin (A).
[Thermoplastic Resin Composition (A)]
  70 weight % of high-density polyethylene (A-4) (available from Tosoh Corporation, product name: Niporon HD4020) having a melt mass-flow rate of 5.5 g/10 minutes and a melting point of 133° C.
  10 weight % of polypropylene (A-5) (available from Japan Polypropylene Corporation, product name: NOVATEC PP FW4BT) having a melt mass-flow rate of 6.5 g/10 minutes and a melting point of 137° C.

10 weight % of PETG resin (A-6) (available from Eastman Chemical Company, product name: Eastar GN5011) having a glass-transition temperature of 67° C.

10 weight % of an ethylene-vinyl alcohol copolymer (A-7) (available from Kuraray Co., Ltd., product name: EVAL C109B) having an ethylene content of 35 mol % and a melting point of 177° C.

The press sheet thus obtained was subjected to the tensile test and the impact test. The result of the evaluation is shown in Table 7.

TABLE 7

|  |  |  | Ex.*¹ | | C. Ex.*² |
|---|---|---|---|---|---|
|  |  |  | 21 | 22 | 11 |
| Composition | Thermoplastic resin (A) | A-4 | 49 | 49 | 70 |
|  |  | A-5 | 7 | 7 | 10 |
|  |  | A-6 | 7 | 7 | 10 |
|  |  | A-7 | 7 | 7 | 10 |
|  | Ethylene-vinyl acetate copolymer (B) | B-25 | 15 | 15 |  |
|  |  | B-40 |  |  |  |
|  |  | B-50 | 7.5 | 7.5 |  |
|  |  | B-70 |  |  |  |
|  |  | B-80 | 7.5 | 7.5 |  |
|  | Crosslinking agent | With/ Without |  |  | — |
| (B) Details | Degree of saponification (%) |  | 0 | 0 | — |
|  | Difference in vinyl acetate content between components (weight %) |  | 25 30 55 | 25 30 55 |  |
| Kneading condition | Screw speed (rpm) |  | 100 | 600 | 600 |
| Performance | Impact strength (kJ/m) |  | 5.5 | 9.5 | 1.0 |
|  | Elongation at break (%) |  | 300 | 400 | 3 |

*¹"Ex." stands for "Example".
*²"C. Ex." stands for "Comparative Example".

The detailed description of the present invention has been made with reference to specific embodiments and aspects. However, it is clear for a person skilled in the art that various alternations and modifications can be made without departing from the gist and scope of the present invention.

The entire contents of the specifications, claims, drawings, and abstracts of Japanese Patent Application No. 2019-009375 filed on Jan. 23, 2019, Japanese Patent Application No. 2019-207702 filed on Nov. 18, 2019, and Japanese Patent Application No. 2020-005783 filed on Jan. 17, 2020 are cited and incorporated herein as the disclosure of the specification of the present invention.

INDUSTRIAL APPLICABILITY

A molded article made of a resin composition in accordance with an aspect of the present invention is applicable to various usages, such as automobile parts, housings of electric and electronic parts, building materials, civil construction members, agricultural materials, containers, package materials, adhesives, and daily necessaries.

The invention claimed is:

1. A resin composition comprising:
a thermoplastic resin (A) in an amount of not less than 1 weight % and not more than 99 weight %; and
an ethylene-vinyl acetate copolymer composition (B) in an amount of not less than 1 weight % and not more than 99 weight %, the ethylene-vinyl acetate copolymer composition (B) including two or more kinds of ethylene-vinyl acetate copolymers having different vinyl acetate contents,
a total amount of (A) and (B) being 100 weight %,
wherein the two or more kinds of ethylene-vinyl acetate copolymers having different vinyl acetate contents include two or more of the following ethylene-vinyl acetate copolymers:
an ethylene-vinyl acetate copolymer having a vinyl acetate content of not less than 15 weight % and not more than 30 weight %,
an ethylene-vinyl acetate copolymer having a vinyl acetate content of not less than 45 weight % and not more than 55 weight %, or
an ethylene-vinyl acetate copolymer having a vinyl acetate content of not less than 75 weight % and not more than 85 weight %, and
wherein in a case where a difference in vinyl acetate content is taken between the copolymers in the ethylene-vinyl acetate copolymer composition (B), a difference in vinyl acetate content between copolymers of at least one pair among the copolymers in the ethylene-vinyl acetate copolymer composition (B) is not more than 40 weight %.

2. The resin composition as set forth in claim 1, wherein the ethylene-vinyl acetate copolymer composition (B) includes three or more kinds of ethylene-vinyl acetate copolymers having different vinyl acetate contents.

3. The resin composition as set forth in claim 1, wherein in a case where a difference in vinyl acetate content is taken between the copolymers in the ethylene-vinyl acetate copolymer composition (B), a difference in vinyl acetate content between copolymers of every pair among the copolymers in the ethylene-vinyl acetate copolymer composition (B) is not more than 70 weight %.

4. The resin composition as set forth in claim 1, wherein the ethylene-vinyl acetate copolymer composition (B) is crosslinked.

5. The resin composition as set forth in claim 1, wherein the ethylene-vinyl acetate copolymer composition (B) is a hydrolysate.

6. The resin composition as set forth in claim 1, wherein the thermoplastic resin (A) contains at least one kind selected from the group consisting of polyolefin, polyester, an acrylic resin, polyamide, polycarbonate, polystyrene, and a styrene-acrylonitrile copolymer.

7. The resin composition as set forth in claim 1, wherein the thermoplastic resin (A) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, polybutylene terephthalate, polylactic acids, a copolymer of L-lactic acid and D-lactic acid, and a stereo complex of poly-L-lactic acid and poly-D-lactic acid, and polybutylene succinate.

8. The resin composition as set forth in claim 7, wherein the thermoplastic resin (A) is at least one kind selected from the group consisting of polylactic acids, a copolymer of L-lactic acid and D-lactic acid, and a stereo complex of poly-L-lactic acid and poly-D-lactic acid, and polybutylene succinate.

9. The resin composition as set forth in claim 7, wherein the thermoplastic resin (A) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, and polybutylene terephthalate.

10. A method for producing the resin composition recited in claim 1, said method comprising the step of:
   kneading the thermoplastic resin (A) and the ethylene-vinyl acetate copolymer composition (B) with a twin-screw extruder.

11. The method as set forth in claim 10, wherein
   in the step of kneading the thermoplastic resin (A) and the ethylene-vinyl acetate copolymer composition (B) with the twin-screw extruder, the twin-screw extruder operates at a screw speed of not lower than 50 rpm and not higher than 3000 rpm.

12. A resin composition obtained by the method recited in claim 11.

13. A molded product obtained by molding the resin composition recited in claim 1.

14. The resin composition according to claim 1, consisting of:
   the thermoplastic resin (A); and
   the ethylene-vinyl acetate copolymer composition (B).

15. The resin composition according to claim 1, wherein
   the thermoplastic resin (A) in an amount of not less than 50 weight % and not more than 90 weight %; and
   the ethylene-vinyl acetate copolymer composition (B) in an amount of not less than 10 weight % and not more than 50 weight %.

* * * * *